(12) United States Patent
Williams et al.

(10) Patent No.: US 7,588,718 B2
(45) Date of Patent: *Sep. 15, 2009

(54) APPARATUS FOR INJECTING GAS INTO A VESSEL

(75) Inventors: Trevor Williams, Boweya via Glenrowan (AU); Barry Alan Cady, Chelsea (AU)

(73) Assignee: Technological Resources Pty Limited, Melbourne, Victoria (AU)

( * ) Notice: Subject to any disclaimer, the term of this patent is extended or adjusted under 35 U.S.C. 154(b) by 153 days.

This patent is subject to a terminal disclaimer.

(21) Appl. No.: 11/249,503

(22) Filed: Oct. 14, 2005

(65) Prior Publication Data

US 2006/0108722 A1    May 25, 2006

(30) Foreign Application Priority Data

Oct. 15, 2004    (AU) ............................. 2004906006

(51) Int. Cl.
*C21C 7/00*    (2006.01)
(52) U.S. Cl. ..................... 266/217; 266/240; 266/270
(58) Field of Classification Search ................ 266/270, 266/241, 217
See application file for complete search history.

(56) References Cited

U.S. PATENT DOCUMENTS

| 6,440,356 | B2 * | 8/2002 | Dunne ....................... 266/270 |
| 6,673,305 | B2 * | 1/2004 | Dunne et al. ................. 266/270 |
| 7,138,085 | B2 * | 11/2006 | Ohrt et al. .................... 266/270 |
| 2001/0052311 | A1 * | 12/2001 | Stricker et al. .............. 110/182 |
| 2003/0011114 | A1 * | 1/2003 | Dunne et al. ................. 266/225 |
| 2006/0108723 | A1 * | 5/2006 | Williams et al. ............ 266/217 |

FOREIGN PATENT DOCUMENTS

WO    WO 03/102248 A2 *  12/2003    ................. 266/270

* cited by examiner

*Primary Examiner*—Scott Kastler
(74) *Attorney, Agent, or Firm*—Finnegan, Henderson, Farabow, Garrett and Dunner, L.L.P.

(57) ABSTRACT

An apparatus for injecting gas into a vessel includes a gas flow duct which receives hot gas through a gas inlet structure at a rear end of the duct. The forward end of the duct has an annular duct with an internal cooling water passage. Cooling water supply and return passages are formed within the wall of the duct such that water flows to and from a tip through the supply and return passages. The tip includes a hollow shell and a partitioning structure that has a ring and a plurality of circumferential flanges that project outwardly from the ring to the shell to form a series of water flow galleries, each extending circumferentially around the tip and interconnected for flow of cooling water sequentially through the galleries from the water supply passages to the water return passage. The circumferential flanges also serve as buttress supports for the shell.

13 Claims, 5 Drawing Sheets

APPARATUS FOR INJECTING GAS INTO A VESSEL

TECHNICAL FIELD

The present invention provides an apparatus for injecting gas into a vessel. It has particular, but not exclusive application to apparatus for injecting a flow of gas into a metallurgical vessel under high temperature conditions. Such metallurgical vessel may for example be a smelting vessel in which molten metal is produced by a direct smelting process.

A known direct smelting process, which relies on a molten metal layer as a reaction medium, and is generally referred to as the HIsmelt process, is described in International application PCT/AU96/00197 (WO 96/31627) in the name of the applicant.

The HIsmelt process as described in the International application comprises:
  (a) forming a bath of molten iron and slag in a vessel;
  (b) injecting into the bath:
    (i) a metalliferous feed material, typically metal oxides; and
    (ii) a solid carbonaceous material, typically coal, which acts as a reductant of the metal oxides and a source of energy; and
  (c) smelting metalliferous feed material to metal in the metal layer.

The term "smelting" is herein understood to mean thermal processing wherein chemical reactions that reduce metal oxides take place to produce liquid metal.

The HIsmelt process also comprises post-combusting reaction gases, such as CO and $H_2$ released from the bath in the space above the bath with oxygen-containing gas and transferring the heat generated by the post-combustion to the bath to contribute to the thermal energy required to smelt the metalliferous feed materials.

The HIsmelt process also comprises forming a transition zone above the nominal quiescent surface of the bath in which there is a favourable mass of ascending and thereafter descending droplets or splashes or streams of molten metal and/or slag which provide an effective medium to transfer to the bath the thermal energy generated by post-combusting reaction gases above the bath.

In the HIsmelt process the metalliferous feed material and solid carbonaceous material is injected into the metal layer through a number of lances/tuyeres which are inclined to the vertical so as to extend downwardly and inwardly through the side wall of the smelting vessel and into the lower region of the vessel so as to deliver the solids material into the metal layer in the bottom of the vessel. To promote the post combustion of reaction gases in the upper part of the vessel, a blast of hot air, which may be oxygen enriched, is injected into the upper region of the vessel through the downwardly extending hot air injection lance. To promote effective post combustion of the gases in the upper part of the vessel, it is desirable that the incoming hot air blast exit the lance with a swirling motion. To achieve this, the outlet end of the lance may be fitted with internal flow guides to impart an appropriate swirling motion. The upper regions of the vessel may reach temperatures of the order of 2000° C. and the hot air may be delivered into the lance at temperatures of the order of 1100-1400° C. The lance must therefore be capable of withstanding extremely high temperatures both internally and on the external walls, particularly at the delivery end of the lance which projects into the combustion zone of the vessel.

U.S. Pat. No. 6,440,356 discloses a gas injection lance construction designed to meet the extreme conditions encountered in the HIsmelt process. In that construction, the flow guides are in the form of spiral vanes mounted on a central body at the forward end of a gas flow duct. Those vanes are connected to the wall of the gas flow duct and are internally water cooled by cooling water which flows through supply and return passages within the wall of the duct. U.S. Pat. No. 6,673,305 discloses an alternative lance construction in which spiral flow guide vanes are mounted on a central tubular structure extending throughout the length of the gas flow duct. The central structure is provided with water flow passages which provide for the flow of cooling water to the front part of the central structure which is located generally within the tip of the gas flow duct. In that construction, the flow guide vanes are not cooled and are set back from the tip of the duct within a refractory lined wall section of the duct.

In the constructions disclosed in U.S. Pat. Nos. 6,440,356 and 6,673,305 the tip of the duct is formed with a single annular space through which cooling water flows from the delivery to the return passages in the duct wall. The present invention provides an improved construction which enables better cooling, particularly of the inner peripheral and end parts of the tip and also permits a construction of significantly improved structural strength.

DISCLOSURE OF THE INVENTION

According to the invention, there is provided apparatus for injecting gas into a vessel, including
a gas flow duct extending from a rear end to a forward end from which to discharge gas from the duct;
cooling water supply and return passages extending through the wall of the gas flow duct from its rear end to its forward end for supply and return of cooling water to the forward end of the duct; and
an annular duct tip disposed at the forward end of the duct and having an internal cooling water passage connecting with the cooling water supply and return passages so as to receive and return a flow of cooling water to internally cool the duct tip;
wherein the duct tip is of hollow annular formation and is internally divided by a partitioning structure to form said water cooling passage as a series of annular water flow galleries each extending circumferentially around the tip and interconnected for flow of cooling water sequentially through the galleries from the cooling water supply passage to the cooling water return passage.

The annular duct tip may comprise a hollow shell and the partitioning structure may comprise a ring disposed within the shell and provided with a plurality of circumferential flanges projecting outwardly from a central part of the ring to the shell so as to divide the interior of the shell into said water flow galleries and to serve as buttress supports for the shell.

At least some of the flanges of the ring may be welded to the shell.

The shell may be comprised of a series of annular segments connected together, for example by welding.

The shell segments may include one or more segments made of high thermal conductivity material such as copper or a copper alloy at the inner periphery and forward end of the tip and one or more segments of stronger material such as steel connected to the duct wall.

The partitioning structure may be made of steel and the flanges of that structure may be welded to steel segments of the shell.

The wall of the gas flow duct may comprise three concentric tubes defining inner and outer spaces providing the cooling water and supply passages.

The inner tube may be internally lined with refractory material.

A mounting may be connected to the rear end of the outer tube whereby the apparatus can be supported in an upright condition through the outer tube and the partitioning structure may provide a structural interconnection between the outer and inner tubes to transfer gravitational load forces from the inner tube to the outer tube.

The partitioning structure may be connected to the front end of the intermediate tube so as also to provide a structural interconnection for transfer of load forces from the intermediate tube to the outer tube.

The rear ends of the intermediate and outer tubes may be supported so as to permit longitudinal movements thereof relative to the outer tube to accommodate thermal expansion and contraction.

The apparatus may further comprise an elongate central structure provided with a plurality of flow directing vanes disposed within the forward end of the duct to impart swirl to a gas flow through the forward end of the duct.

BRIEF DESCRIPTION OF THE DRAWINGS

In order that the invention may be more fully explained, one particular embodiment will be described in some detail with reference to the accompanying drawings in which.

DETAILED DESCRIPTION OF THE PREFERRED EMBODIMENT

Figure 1:
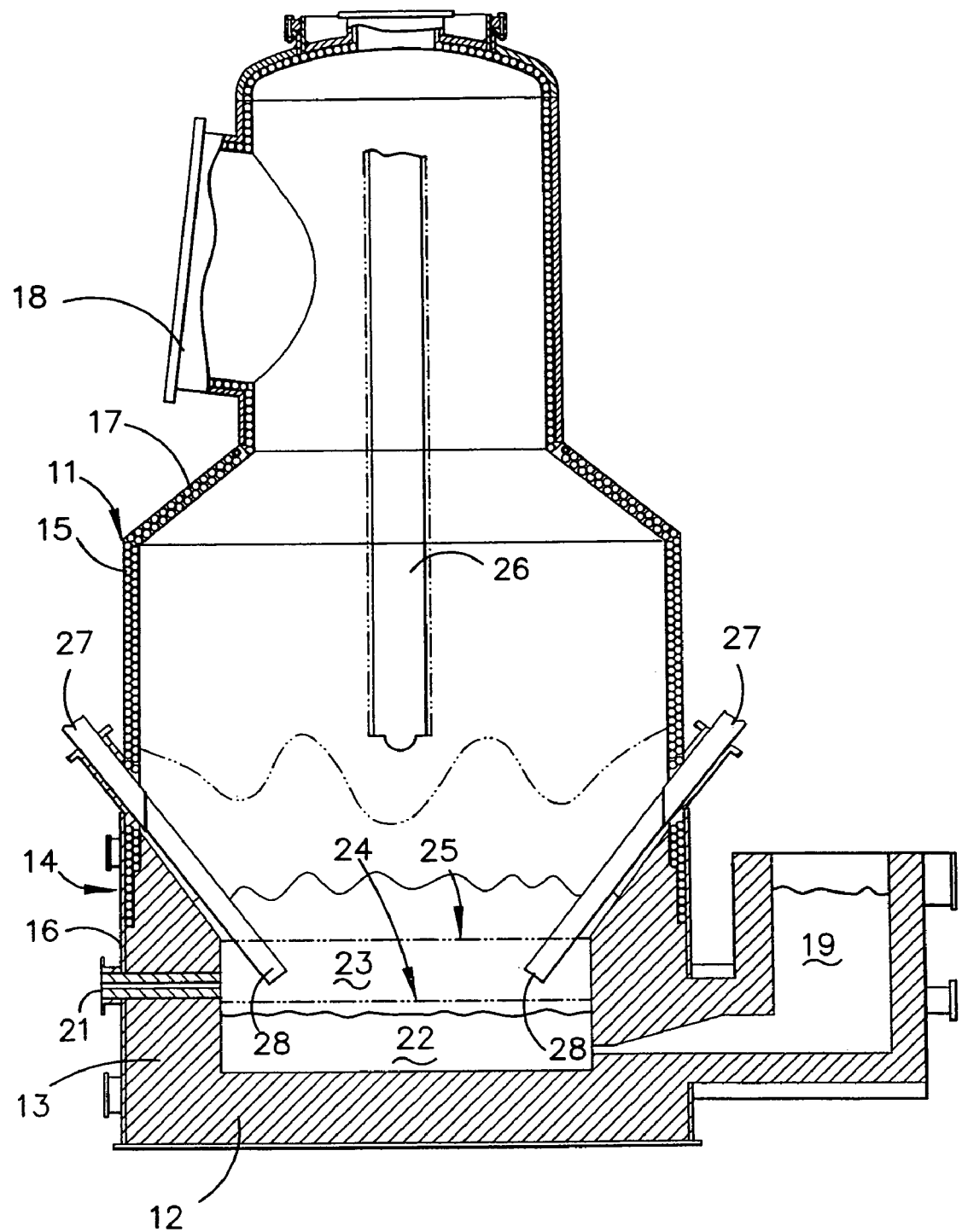
FIG. 1 is a vertical section through a direct smelting vessel incorporating a hot air injection lance constructed in accordance with the invention.
Figure 2:
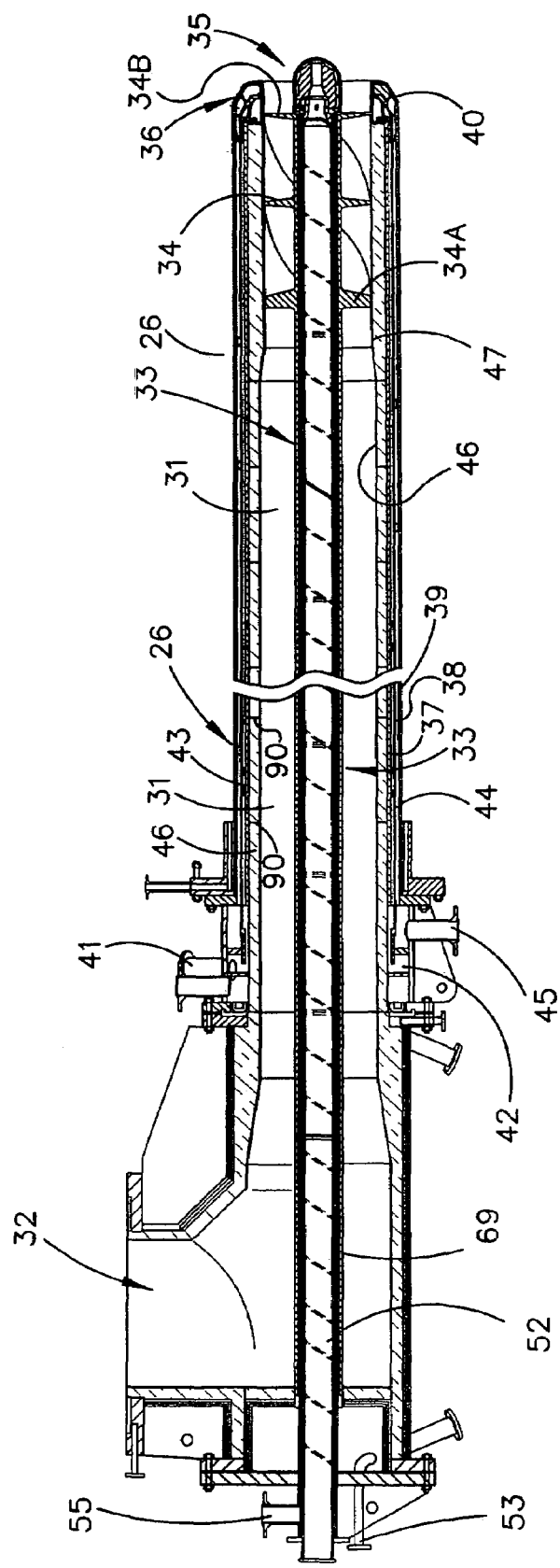
FIG. 2 is a longitudinal cross-section through the hot air injection lance.
Figure 3:
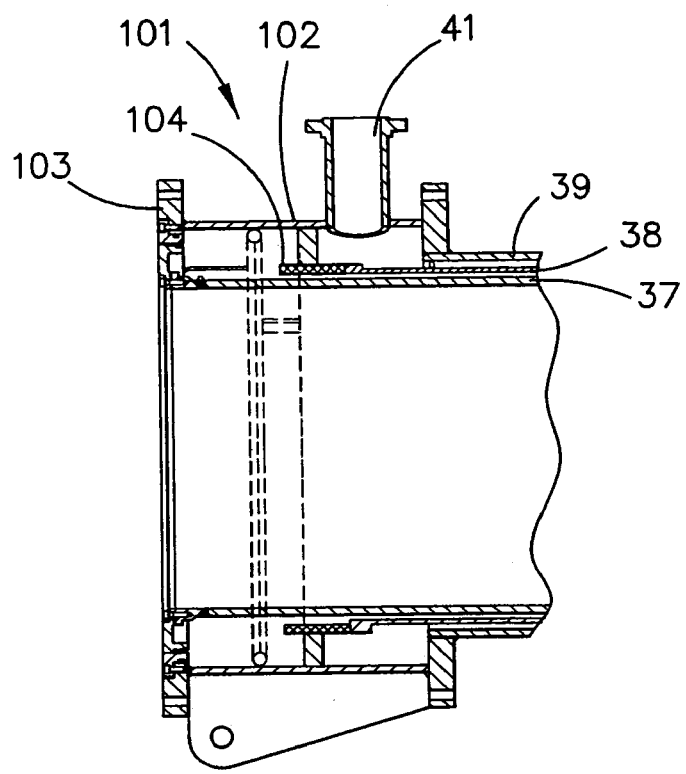
FIG. 3 illustrates a mounting assembly of the lance.
Figure 4:
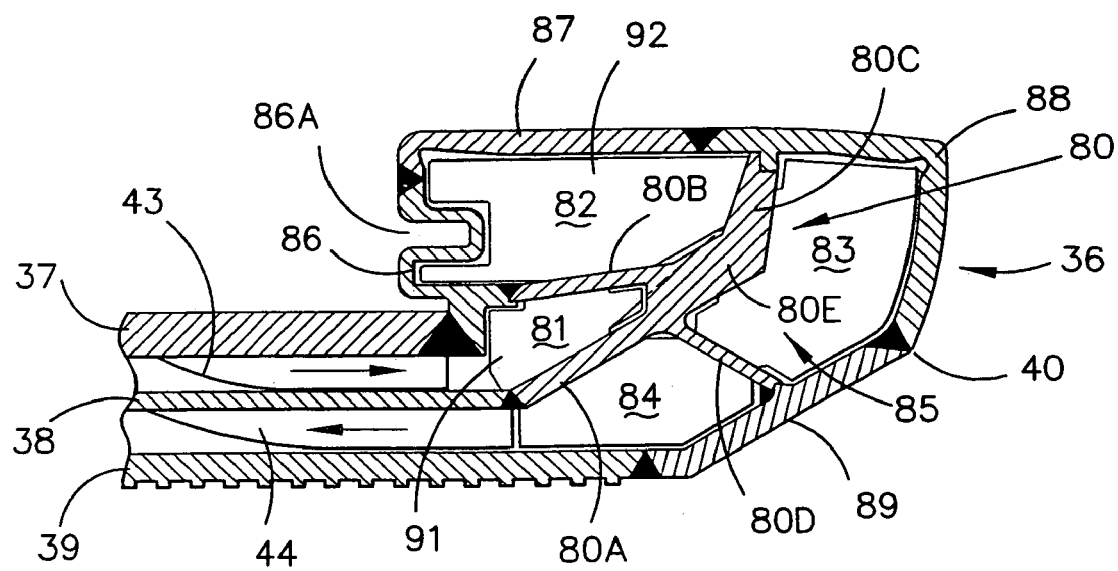
FIG. 4 is a detail to enlarged scale showing the construction of a duct tip at the forward end of an outer duct of the lance.
Figure 5:
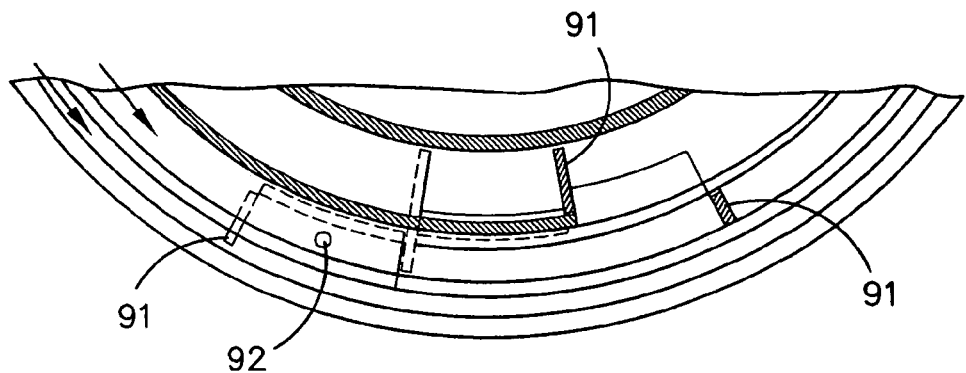
FIG. 5 is a partial cross-section through part of the duct tip.
Figure 6:
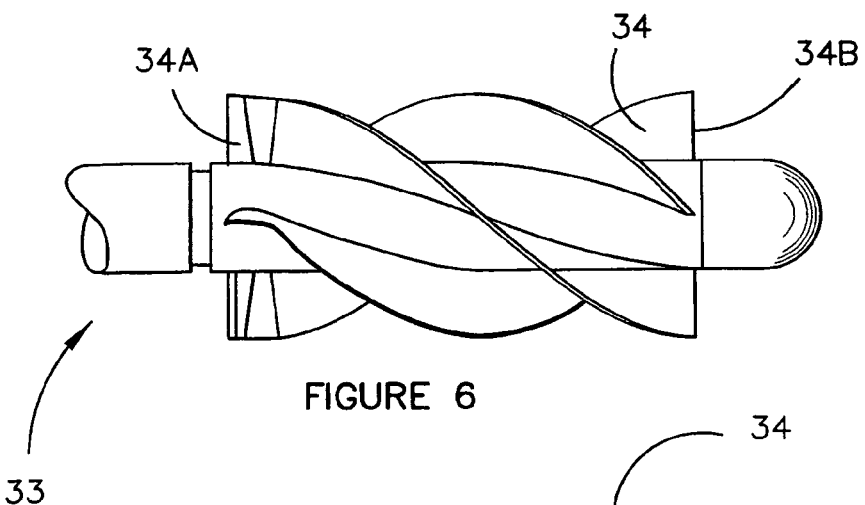
FIGS. 6 and 7 illustrate the construction of a front part of a central structure of the lance.
Figure 7:
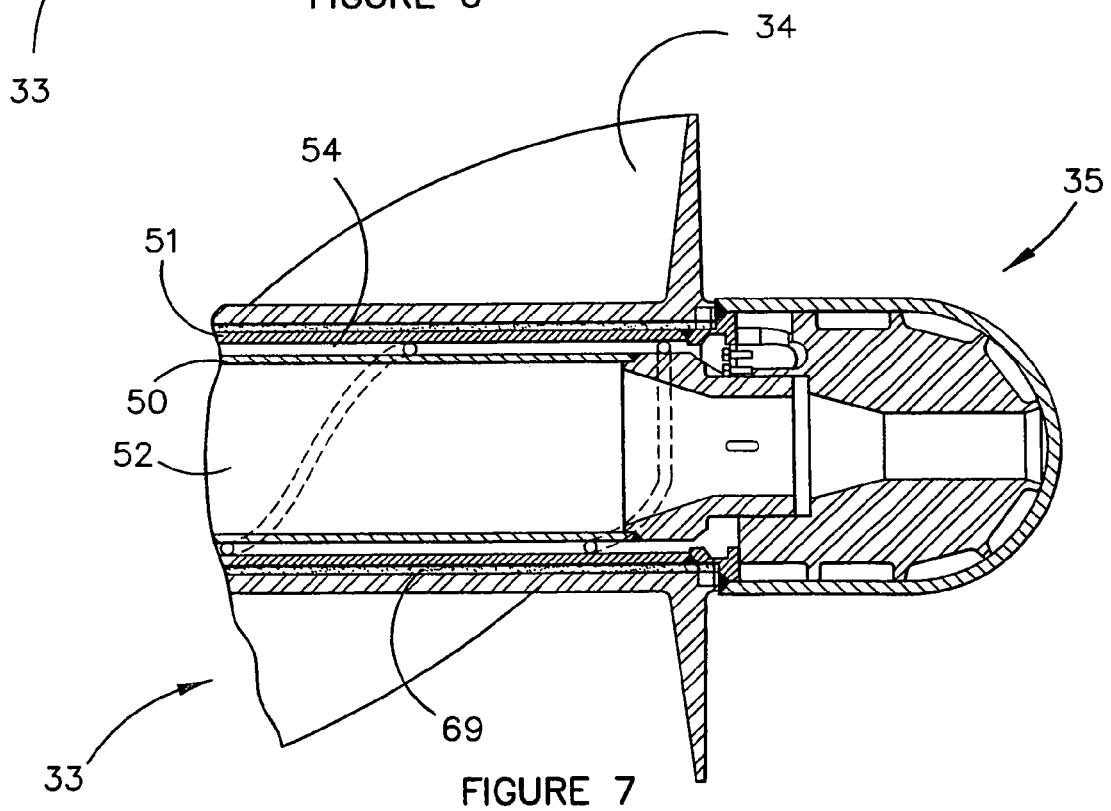
Figure 8:
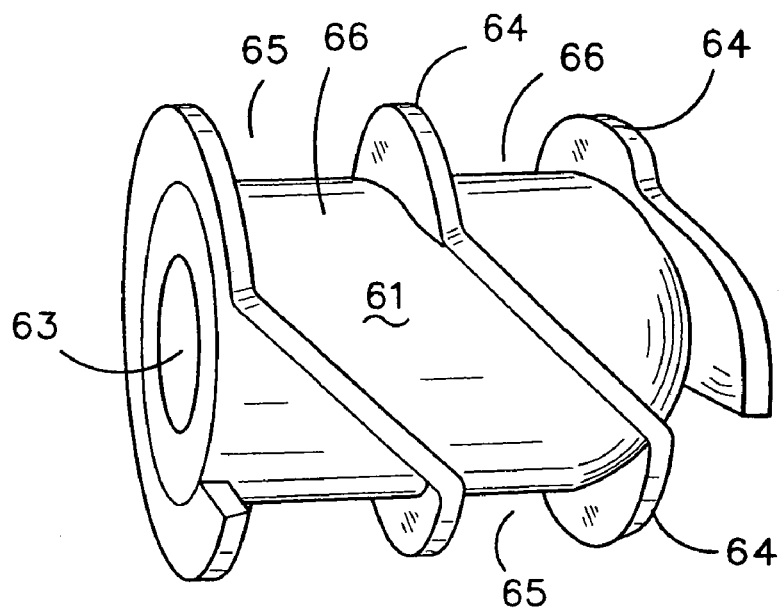
FIGS. 8 and 9 illustrate the construction of a forward nose end of the central structure of the lance.
Figure 9:
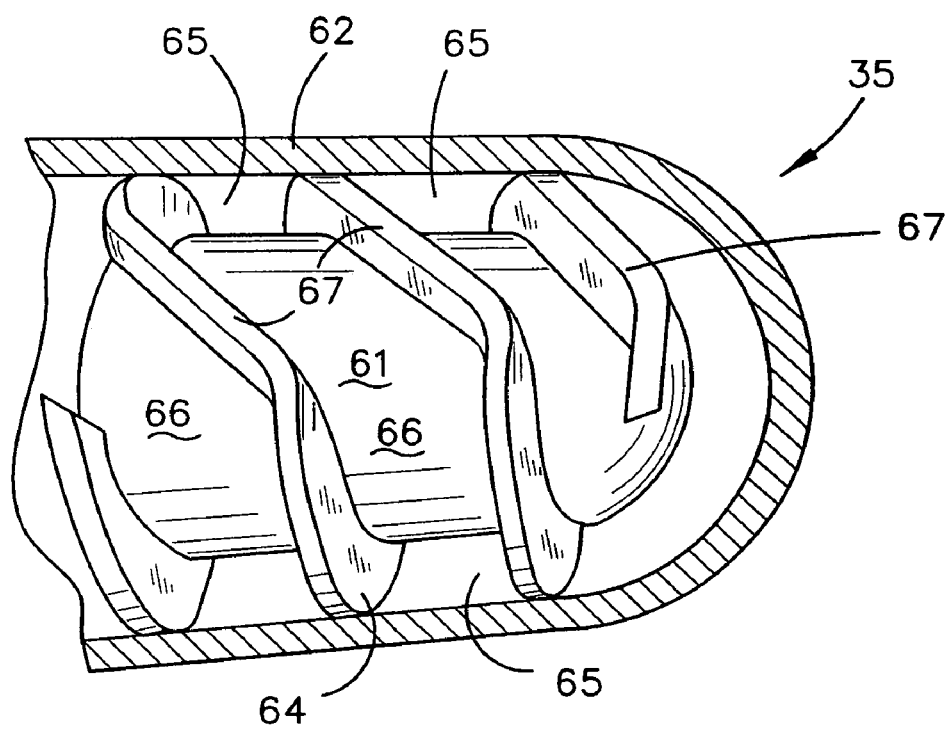

FIG. 1 illustrates a direct smelting vessel suitable for operation by the HIsmelt process as described in International Patent Application PCT/AU96/00197. The metallurgical vessel is denoted generally as 11 and has a hearth that includes a base 12 and sides 13 formed from refractory bricks; side walls 14 which form a generally cylindrical barrel extending upwardly from the sides 13 of the hearth and which includes an upper barrel section 15 and a lower barrel section 16; a roof 17; an outlet 18 for off-gases; a forehearth 19 for discharging molten metal continuously; and a tap-hole 21 for discharging molten slag.

In use, the vessel contains a molten bath of iron and slag which includes a layer 22 of molten metal and a layer 23 of molten slag on the metal layer 22. The arrow marked by the numeral 24 indicates the position of the nominal quiescent surface of the metal layer 22 and the arrow marked by the numeral 25 indicates the position of the nominal quiescent surface of the slag layer 23. The term "quiescent surface" is understood to mean the surface when there is no injection of gas and solids into the vessel.

The vessel is fitted with a downwardly extending hot air injection lance 26 for delivering a hot air blast into an upper region of the vessel and solids injection lances 27 extending downwardly and inwardly through the side walls 14 and into the slag layer 23 for injecting iron ore, solid carbonaceous material, and fluxes entrained in an oxygen-deficient carrier gas into the metal layer 22. The position of the lances 27 is selected so that their outlet ends 28 are above the surface of the metal layer 22 during operation of the process. This position of the lances reduces the risk of damage through contact with molten metal and also makes it possible to cool the lances by forced internal water cooling without significant risk of water coming into contact with the molten metal in the vessel.

The construction of the hot air injection lance 26 is illustrated in FIGS. 2 to 9. As shown in these figures lance 26 comprises an elongate duct 31 which receives hot gas through a gas inlet structure 32 and injects it into the upper region of vessel. An annular duct tip 36 is disposed at the forward end of the gas flow duct 31. The lance includes an elongate central tubular structure 33 which extends within the gas flow duct 31 from its rear end to its forward end. Adjacent the forward end of the duct, central structure 33 carries a series of swirl imparting vanes 34 for imparting swirl to the gas flow exiting the duct. Swirl vanes 34 may be formed to a four start helical configuration. Their inlet (rear) ends may have a smooth transition from initial straight sections to a fully developed helix to minimise turbulence and pressure drop.

The forward end of central structure 33 has a domed nose 35 which projects forwardly beyond the tip 36 of duct 31 so that the forward end of the central body and the duct tip co-act together to form an annular nozzle for divergent flow of gas from the duct with swirl imparted by the vanes 34.

The wall of the main part of duct 31 extending downstream from the gas inlet 32 is internally water cooled. This section of the duct is comprised of a series of three concentric steel tubes 37, 38, 39 extending to the forward end part of the duct where they are connected to the duct tip 36. The duct tip 36 is of hollow annular formation and is internally divided by a partitioning structure 80 which divides the interior of the tip into four water flow galleries 81, 82, 83, 84 which interconnect to form a single cooling water passage denoted generally as 85 to which cooling water is supplied and returned through passages in the wall of duct 31. Specifically, cooling water is supplied through an inlet 41 and annular inlet manifold 42 into an inner annular water flow passage 43 defined between the tubes 37, 38 of the duct through to the duct tip 36. Water is returned from the tip through an outer annular water return flow passage 44 defined between the tubes 38, 39 and backwardly to a water outlet 45 at the rear end of the water cooled section of duct 31.

Duct tip 36 has an outer shell 40 formed by four annular segments 86, 87, 88 and 89 which are welded together to form the outer shell. Segment 86 forms a rear wall of the duct tip 36 and is welded to the innermost tube 37 of the tubes constituting the wall of the duct. Partitioning structure 80 comprises a steel ring disposed within the tip shell 40 and provided with four circumferential flanges 80A, 80B, 80C and 80D projecting outwardly from a central part 80E of the ring so as to divide the interior of the shell into the water flow galleries 81-84 and to serve as buttress supports for the shell. Flange 80A is welded to the intermediate tube 38 of the duct wall and flanges 80B and 80D are welded to tip shell segments 86 and 89 to complete the interconnection of the tip to the duct wall and to divide the interior of the tip into the cooling water flow galleries 81, 82, 83 and 84. Baffles 91, are fitted between the partition structure 80 and the shell to define ends of the water flow galleries. Ports 92 are located in the flanges of the partitioning ring adjacent these baffles to cause the water to flow successively around the tip firstly through gallery 81 then through gallery 82 then through gallery 83 and finally to gallery 84. The water enters gallery 81 from the water flow passage 43 defined between the tubes 37, 38 of the duct and exits gallery 84 through return passage 44 defined between the tubes 38, 39.

The duct tip shell segments 87 and 88 defining the inner periphery and outer end of the tip are made of copper to enhance cooling of these parts of the tip whereas the segments 86 and 89 and the partitioning structure 80 are formed of steel to produce a very strong reinforced tip structure which allows for the transmission of load forces from the inner and intermediate tubes 37, 38 to the outer tube 39 of the duct as described in more detail below.

The lance is provided at its rear end with a mounting assembly 101 comprising a water cooled outer housing 102 connected to the outer duct tube 39 and to a mounting flange 103 for connection to an upper part of the vessel such that the lance will be suspended in a vertical orientation from the mounting flange with all of its weight taken through the outer duct tube 39. The rear end of the intermediate tube 38 is supported by a sliding seal 104 within the housing 102 and the rear end of the inner tube 39 is a sliding fit in the mounting flange 103 to permit relative longitudinal movements of the tubes on differential expansion of the various lance components.

The water cooled section of duct 31 is internally lined with an internal refractory lining 46 that fits within the innermost metal tube 39 of the duct and extends through to the water cooled tip 36 of the duct. The inner periphery of duct tip 36 is generally flush with the inner surface of the refractory lining which defines the effective flow passage for gas through the duct. The forward end of the refractory lining has a slightly reduced diameter section 47 which is generally flush with the inner periphery of the duct tip 36. The refractory lining is formed in sections fitted within the inner duct tube 37. When the lance is installed and in a vertical condition, the bottom section of the lining sits on the rear wall 86 of the duct tip and the other lining sections are supported on bricking rings 90 welded to the tube 39. Accordingly, the full weight of the refractory lining is imparted downwardly on to the inner tube 39 of the duct. Since the duct is fully supported by its upper end through the outer tube 39, this downward loading must be transferred from the inner tube to the outer tube through the interconnection provided by the tip wall 86, the partitioning structure 80 and the tip structure 89 all of which are made of steel and which provide a very solid rigid and braced interconnection capable of transmitting those forces.

Rearwardly from section 47 the refractory lining is of slightly greater diameter to enable the central structure 33 to be inserted downwardly through the duct on assembly of the lance without fouling the refractory. The swirl vanes 34 are then moved within the reduced diameter section of the refractory until their forward ends enter within the rearmost part of the duct tip 36. In the final assembly the vanes extend along central structure 33 from rear ends 34A spaced rearwardly from the duct tip 36 to forward ends 34B disposed within the duct tip. Vanes 34 are dimensioned so that there is a small radial clearance between the vanes and the refractory lining of the duct. They are also dimensioned so that when the lances is in a cold condition there is a small radial clearance of the order of 2 mm between the forward ends of the vanes and the inner periphery of the duct tip 36 but on thermal expansion under operating conditions the forward ends of the vanes are engaged by the internally water cooled tip which then provides lateral support for the vanes and the lower end of the central structure 33. The central structure is long and flexible and if it is not supported the gas blast can cause severe vibration. With the illustrated arrangement lateral support is provided through the engagement of the internally water cooled tip with the vanes. The vanes may be made of a cobalt alloy material such as UMCO 50. They may be formed on a sleeve simply fitted over the lower end of the central structure and keyed to prevent rotation.

The rear wall 86 of duct tip 36 is formed with a deformable midsection to accommodate radial loading on the wall on engagement with the front ends of the vanes 34. More specifically, the annular tip shell segment forming that wall is provided with a deformable corrugation 86A of U-shaped cross-section which can close up to accommodate excess loading on the wall so as to limit stresses in the wall under radial loads generated by thermal movements under the severe operating conditions generated by the HIsmelt process.

The front end of central structure 33 which carries the swirl vanes 34 is internally water cooled by cooling water supplied forwardly through the central structure from the rear end to the forward end of the lance and then returned back along the central structure to the rear end of the lance. This enables a very strong flow of cooling water directly to the forward end of the central structure and to the domed nose 35 in particular which is subjected to very high heat flux in operation of the lance.

Central structure 33 comprises inner and outer concentric steel tubes 50, 51 formed by tube segments, disposed end to end and welded together. Inner tube 50 defines a central water flow passage 52 through which water flows forwardly through the central structure from a water inlet 53 at the rear end of the lance through to the front end nose 35 of the central structure and an annular water return passage 54 defined between the two tubes through which the cooling water returns from nose 35 back through the central structure to a water outlet 55 at the rear end of the lance.

The nose end 35 of central structure 33 comprises an inner copper body 61 fitted within an outer domed nose shell 62 also formed of copper. The inner copper piece 61 is formed with a central water flow passage 63 to receive water from the central passage 52 of structure 33 and direct it to the tip of the nose. Copper body 61 is formed with projecting ribs 64 which fit snugly within the nose shell 62 to define a single continuous cooling water flow passage 65 between the copper body 61 and the outer nose shell 62. The ribs 64 are shaped so that the single continuous passage 65 extends as annular passage segments 66 interconnected by passage segments 67 sloping from one annular segment to the next. Thus passage 65 extends from the tip of the nose in a spiral which, although not of regular helical formation, does spiral around and back along the nose to exit at the rear end of the nose into the annular return passage formed between the tubes 51, 52 of central structure 33.

The forced flow of cooling water in a single coherent stream through spiral passage 65 extending around and back along the nose end 35 of central structure ensures efficient heat extraction and avoids the development of "hot spots" on the nose which could occur if the cooling water is allowed to divide into separate streams at the nose. In the illustrated arrangement the cooling water is constrained in a single stream from the time that it enters the nose end 35 to the time that it exits the nose end.

Inner structure 33 is provided with an external heat shield 69 to shield against heat transfer from the incoming hot gas flow in the duct 31 into the cooling water flowing within the central structure 33. If subjected to the very high temperatures and high gas flows required in a large scale smelting installation, a solid refractory shield may provide only short service. In the illustrated construction the shield 69 is formed of tubular sleeves of ceramic material marketed under the name UMCO. These sleeves are arranged end to end to form a continuous ceramic shield surrounding an air gap between the shield and the outermost tube 51 of the central structure. Further details of the manner in which the shield may be formed will be found in the disclosure of U.S. Pat. No. 6,673,305.

The invention claimed is:

1. An Apparatus for injecting gas into a vessel, including
    a gas flow duct extending from a rear end to a forward end from which to discharge gas from the duct;
    cooling water supply and return passages extending through a wall of the gas flow duct from its rear end to its forward end for supply and return of cooling water to the forward end of the duct, the cooling water supply and return passages being defined by three concentric tubes that form the wall of the duct; and
    an annular duct tip disposed at the forward end of the duct and having an internal cooling water passage connecting with the cooling water supply and return passages so as to receive and return a flow of cooling water to internally cool the duct tip;
    wherein the duct tip is of hollow annular formation and comprises a hollow shell and a partitioning structure disposed within the shell, the partitioning structure having a ring and a plurality of circumferential flanges that project outwardly from the ring to the shell so as to form said water cooling passage as a series of annular water flow galleries each extending circumferentially around the tip and interconnected for flow of cooling water sequentially through the galleries from the cooling water supply passage to the cooling water return passage, and said circumferential flanges also serving as buttress supports for the shell.

2. The Apparatus of claim 1, wherein at least some of the flanges of the ring are welded to the shell.

3. The Apparatus of claim 2, wherein the shell is comprised of a series of annular segments connected together.

4. The Apparatus of claim 3, wherein the annular segments of the shell are connected together by welding.

5. The Apparatus of claim 4, wherein the shell segments include one or more segments made of high thermal conductivity material at an inner periphery and forward end of the tip and one or more segments of stronger material connected to the duct wall.

6. The Apparatus of claim 5, wherein the high thermal conductivity material is copper or a copper alloy.

7. The Apparatus of claim 6, wherein said stronger material is steel.

8. The Apparatus of claim 1, wherein the duct tip is internally divided by a partitioning structure made of steel, the partitioning structure having its flanges welded to steel segments of the shell.

9. The Apparatus of claim 1, wherein the inner tube is internally lined with refractory material.

10. The Apparatus of claim 1, wherein a mounting is connected to the rear end of the outer tube whereby the apparatus can be supported in an upright condition through the outer tube and the partitioning structure provides a structural interconnection between the outer and inner tubes to transfer gravitational load forces from the inner tube to the outer tube.

11. The Apparatus of claim 10, wherein the partitioning structure is connected to the front end of the intermediate tube so as to also provide a structural interconnection for transfer of load forces from the intermediate tube to the outer tube.

12. The Apparatus of claim 11, wherein the rear end of the intermediate tube and the rear end of the outer tube are supported so as to permit longitudinal movements thereof relative to the outer tube to accommodate thermal expansion and contraction.

13. The Apparatus of claim 12, further comprising an elongate central structure provided with a plurality of flow directing vanes disposed within the forward end of the duct to impart swirl to a gas flow through the forward end of the duct.

* * * * *